US012637607B2

(12) United States Patent
Carroll et al.

(10) Patent No.: US 12,637,607 B2
(45) Date of Patent: May 26, 2026

(54) CARBON DIOXIDE SEQUESTERED CEMENT FOR WELL CEMENTING

(71) Applicant: Chevron U.S.A. Inc., San Ramon, CA (US)

(72) Inventors: Caleb Kimbrell Carroll, Houston, TX (US); Deryck Edward Matthew Williams, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 17 days.

(21) Appl. No.: 18/751,778

(22) Filed: Jun. 24, 2024

(65) Prior Publication Data

US 2024/0343967 A1     Oct. 17, 2024

Related U.S. Application Data

(62) Division of application No. 17/826,275, filed on May 27, 2022, now Pat. No. 12,043,793.

(60) Provisional application No. 63/193,970, filed on May 27, 2021.

(51) Int. Cl.
| | |
|---|---|
| *C09K 8/46* | (2006.01) |
| *C04B 7/36* | (2006.01) |
| *C09K 8/42* | (2006.01) |

(52) U.S. Cl.
CPC ................ *C09K 8/46* (2013.01); *C04B 7/367* (2013.01); *C09K 8/426* (2013.01)

(58) Field of Classification Search
CPC .......... C09K 8/46; C09K 8/426; C09K 8/467; C04B 7/367; C04B 28/02; C04B 40/0039; C04B 2103/0028; Y02P 40/18
See application file for complete search history.

(56) References Cited

U.S. PATENT DOCUMENTS

| | | | |
|---|---|---|---|
| 7,341,105 | B2 | 3/2008 | Bingamon et al. |
| 8,470,275 | B2 | 6/2013 | Constantz et al. |
| 8,603,424 | B2 | 12/2013 | Constantz et al. |
| 9,062,241 | B2 | 6/2015 | Zamora |
| 10,059,870 | B2 | 8/2018 | Joseph et al. |
| 10,322,371 | B2 | 6/2019 | Constantz et al. |
| 10,711,236 | B2 | 7/2020 | Constantz et al. |
| 2011/0203795 | A1 | 8/2011 | Murphy |
| 2014/0322803 | A1* | 10/2014 | Constantz ............... C04B 28/04 |
| | | | 422/168 |
| 2015/0246314 | A1* | 9/2015 | Constantz ............. B01D 53/62 |
| | | | 423/220 |

FOREIGN PATENT DOCUMENTS

| | | | |
|---|---|---|---|
| CA | 2960845 A1 | 6/2016 | |
| EP | 2519483 A1 | 11/2012 | |

* cited by examiner

*Primary Examiner* — Kumar R Bhushan
(74) *Attorney, Agent, or Firm* — King & Spalding LLP

(57) ABSTRACT

A method of making a cement composite can include contacting an aqueous solution comprising calcium ions with a carbon dioxide source producing a carbonated aqueous solution. Fine particles can be submerged in the carbonated aqueous solution to produce microaggregate particles comprising the fine particles coated with calcium carbonate. The microaggregate particles can be combined with cement particles to produce the cement composite. The cement composite can be used in cementing applications for hydrocarbon wells including for casing liners and well plugs.

5 Claims, 8 Drawing Sheets

CARBON DIOXIDE SEQUESTERED CEMENT FOR WELL CEMENTING

RELATED APPLICATIONS

The present application is a divisional application of and claims priority to U.S. patent application Ser. No. 17/826,275 filed May 27, 2022, which application claims priority to U.S. Provisional Patent Application No. 63/193,970 filed May 27, 2021. The entire contents of the foregoing applications are incorporated herein by reference.

TECHNICAL FIELD

Embodiments of the technology relate generally to using cement containing sequestered carbon dioxide for cementing in wells.

BACKGROUND

Wells are drilled into land and subsea formations in order to produce resources such as water and hydrocarbons (e.g. petroleum and natural gas). A substantial amount of cement is used in connection with the drilling and completion of a well and in later remediation and plugging operations. With respect to wells used to produce hydrocarbon resources, the cement that is used must meet particular requirements to satisfy the demands associated with producing hydrocarbons.

For example, the American Petroleum Institute has published API Specification 10A titled "Cements and Materials for Well Cementing," which is incorporated herein by reference. Specification 10A defines six classes of well cements and two classes of composite well cements used in petroleum and natural gas wells. All eight classes involve grinding Portland cement clinker with calcium sulfate and certain additives. Of the two classes of composite well cements, Specification 10A states that Class K composite well cement is obtained by intergrinding or interblending Portland cement clinker, calcium sulfate, and silica and that another constituent also can be interground or interblended with the mixture. (Specification 10A, p. 44-45.) As such, Class K composite well cements provide an opportunity to include another constituent in the cement mixture.

Separately, there have been a variety of efforts throughout various industries to reduce the amount of carbon dioxide released into the atmosphere. The process of manufacturing cement releases significant carbon dioxide into the atmosphere. First, the extraction and transportation of the materials used in the manufacture of cement, including limestone, clay, and gypsum, requires significant energy that involves carbon dioxide emissions. Second, the manufacturing of cement includes carbon dioxide emissions when fossil fuels are burned to heat the kiln used in the manufacturing process. Furthermore, carbon dioxide is emitted during the calcination process when limestone is heated in the kiln to create cement clinker. According to some estimates, producing one ton of Portland cement generates 1,000 lbs. of carbon dioxide emissions.

Accordingly, cement applications that use a cement composite combining Portland cement with other constituents will reduce the total amount of Portland cement, thereby reducing carbon dioxide emissions. Therefore, opportunities to reduce the emission of carbon dioxide in the production and application of cement for cementing wells in the hydrocarbon industry would be beneficial.

SUMMARY

The present disclosure is generally directed to methods of making cement compositions that sequester carbon dioxide and methods of applying the cement compositions having sequestered carbon dioxide to cementing processes in hydrocarbon wells. In one example embodiment, the present disclosure is directed to a method of making a cement composite for a hydrocarbon well, wherein the method comprises contacting an aqueous solution comprising calcium ions with a carbon dioxide source producing a carbonated aqueous solution; submerging fine particles in the carbonated aqueous solution to produce microaggregate particles comprising the fine particles coated with calcium carbonate; and blending the microaggregate particles with cement particles to produce the cement composite.

In the foregoing method, the carbon dioxide source can be at least one of air and flue gas and the flue gas can be produced during manufacture of the cement particles.

The foregoing method can further comprise, after contacting the aqueous solution with the carbon dioxide source, releasing a depleted carbon dioxide gas.

In the foregoing method, the fine particles can be one of hematite, coarse sand, fine sand, glass, silica fume, manganese tetraoxide, and calcium carbonate particles. Particles having a substantial silicon dioxide content (e.g., greater than 75%), such as coarse sand, fine sand, glass, and silica fume, are particularly preferable because they can mitigate cement strength retrogression commonly seen in environments where cement is exposed to temperatures above 230 degrees F. for extended periods of time. The fine particles can have a D50 value between 3 microns and 177 microns and, preferably, the fine particles can have a D50 value between 3 microns and 35 microns.

In the foregoing method, the cement composite can be a Class K cement composition as defined in API Specification 10A. In the foregoing method, the cement composite can comprise greater than or equal to 50% by weight of cement particles and 3% to 50% by weight of microaggregate.

In another example embodiment, the present disclosure is directed to a cement composition comprising cement particles; and microaggregate particles, wherein the microaggregate particles comprise fine particles coated with calcium carbonate.

In the foregoing cement composition, the fine particles comprise at least 75% silicon dioxide. Using fine particles comprising a substantial amount of silicon dioxide strengthens the microaggregate particles which in turn strengthens the cement composition.

In the foregoing cement composition, the microaggregate particles can be formed by submerging the fine particles in an aqueous solution that comprises calcium ions and carbonate. The aqueous solution can be formed from a carbon dioxide source that is at least one of air and flue gas.

In the foregoing cement composition, the fine particles can be one of hematite, coarse sand, fine sand, glass, silica fume, manganese tetraoxide, and calcium carbonate particles. The fine particles can have a D50 value between 3 microns and 177 microns and, preferably, the fine particles can have a D50 value between 3 microns and 35 microns.

The foregoing cement composition can be a Class K cement composition as defined in API Specification 10A. The cement composition can comprise greater than or equal to 50% by weight of cement particles and 3% to 50% by weight of microaggregate.

In yet another example embodiment, the present disclosure is directed to a method of cementing a hydrocarbon well comprising pumping a cement composite into the hydrocarbon well, wherein the cement composite comprises cement particles and microaggregate particles, wherein the microaggregate particles comprise fine particles coated with calcium carbonate.

In the foregoing method, the cement composite can form a casing liner or a plug in the hydrocarbon well. The fine particles can comprise at least 75% silicon dioxide. In the foregoing method, after pumping the cement composite into the hydrocarbon well, the cement composite is exposed to temperatures exceeding 230 degrees F.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments relating to carbon dioxide sequestering cements and applications of those cements and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to systems and methods for cement compositions with sequestered carbon dioxide and applying those cement compositions to hydrocarbon wells. The example embodiments described herein can provide improvements over conventional cements used in hydrocarbon wells. The production of a cement composition that includes sequestered carbon dioxide can reduce the overall volume of carbon dioxide emissions in the cement production process as well as remove existing carbon dioxide from the atmosphere.

First, using a cement composition that combines cement particles and another constituent reduces the amount of raw materials, such as limestone, clay, and gypsum, that must be extracted to manufacture the cement particles, thereby reducing the amount of energy consumed and the amount of carbon dioxide emitted. Second, reducing the amount of cement particles by replacing a portion with another constituent also reduces the volume of the calcination process used to produce cement particles, thereby reducing carbon dioxide emissions. Third, when the other constituent replacing a portion of the cement particles in the cement composition is a material that sequesters carbon dioxide from the atmosphere or from a flue gas, the cement composition locks up carbon dioxide that would otherwise add to the total carbon dioxide in the atmosphere. Therefore, given the foregoing benefits, using the cement composition containing sequestered carbon dioxide in a hydrocarbon well reduces the carbon dioxide emissions that would normally be associated with the hydrocarbon well. As will be described further in the following examples, the methods and apparatus described herein improve upon prior art approaches to producing cement and cementing hydrocarbon wells.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
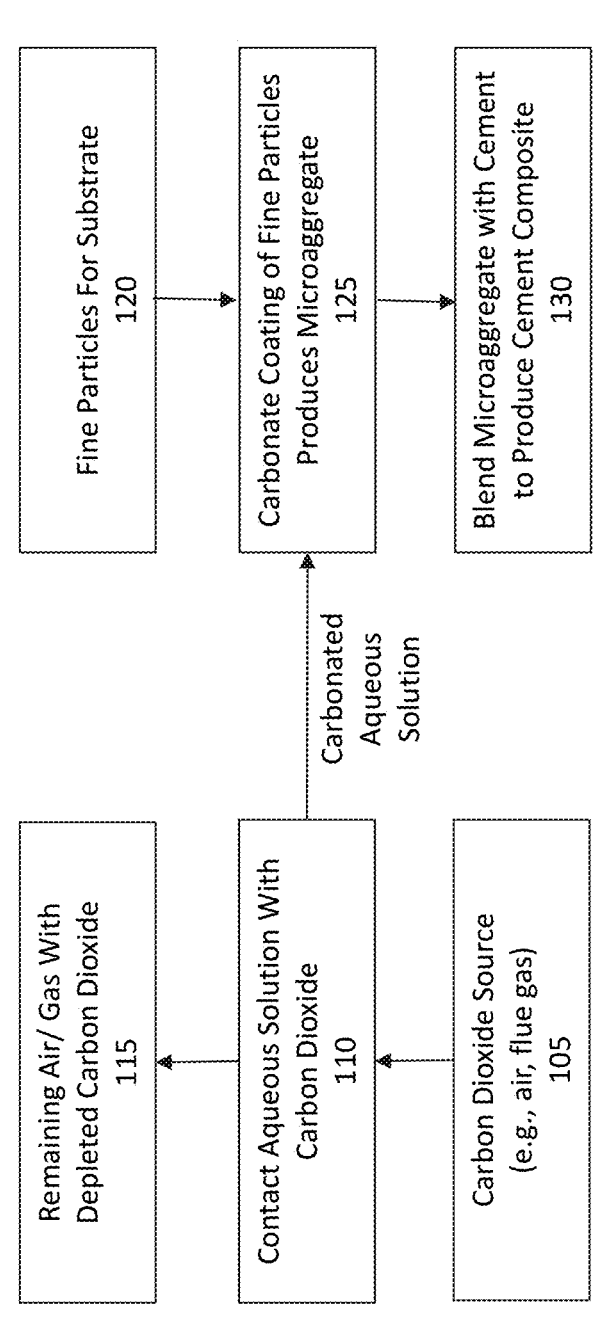
FIG. 1 illustrates a method of producing a cement containing sequestered carbon dioxide in accordance with an example embodiment of the disclosure.
Figure 2:
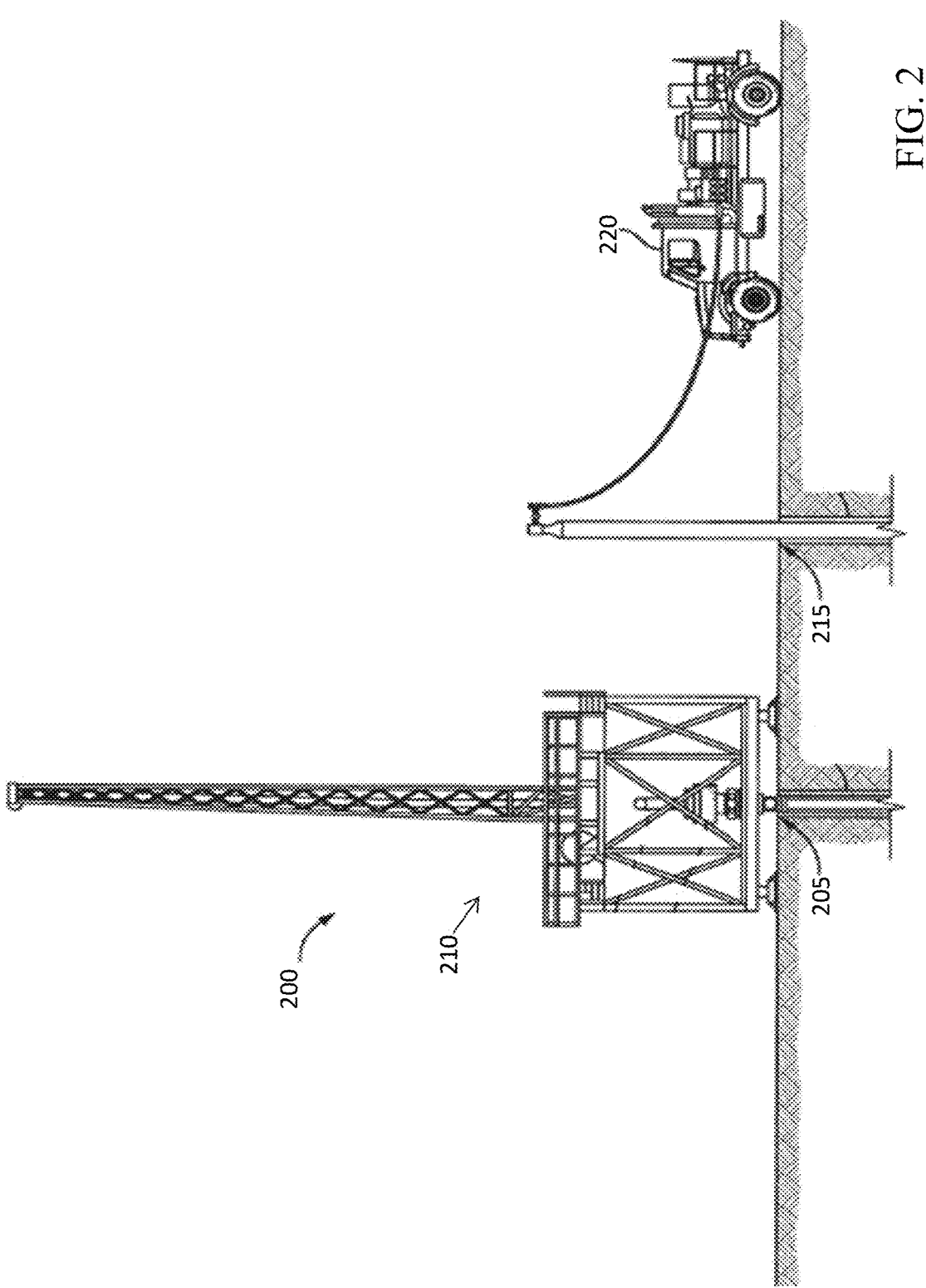
FIG. 2 illustrates a pad comprising two hydrocarbon wells in accordance with an example embodiment of the disclosure.
Figure 4:
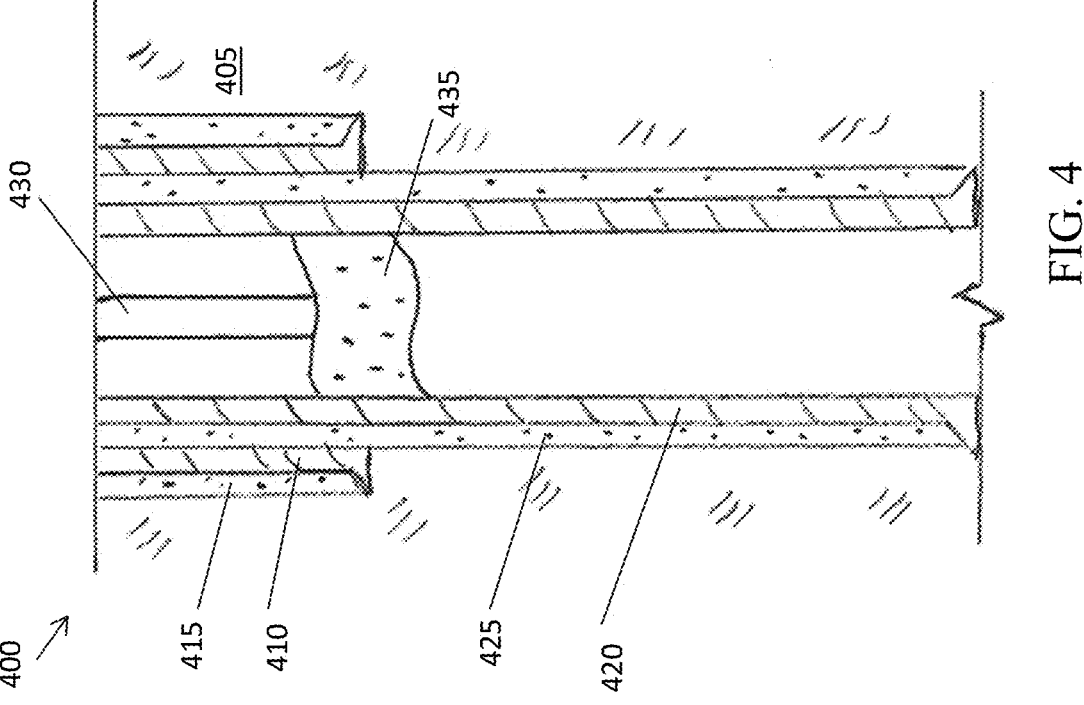
FIG. 4 illustrates another cementing process in a hydrocarbon well in accordance with an example embodiment of the disclosure.
Figure 3:
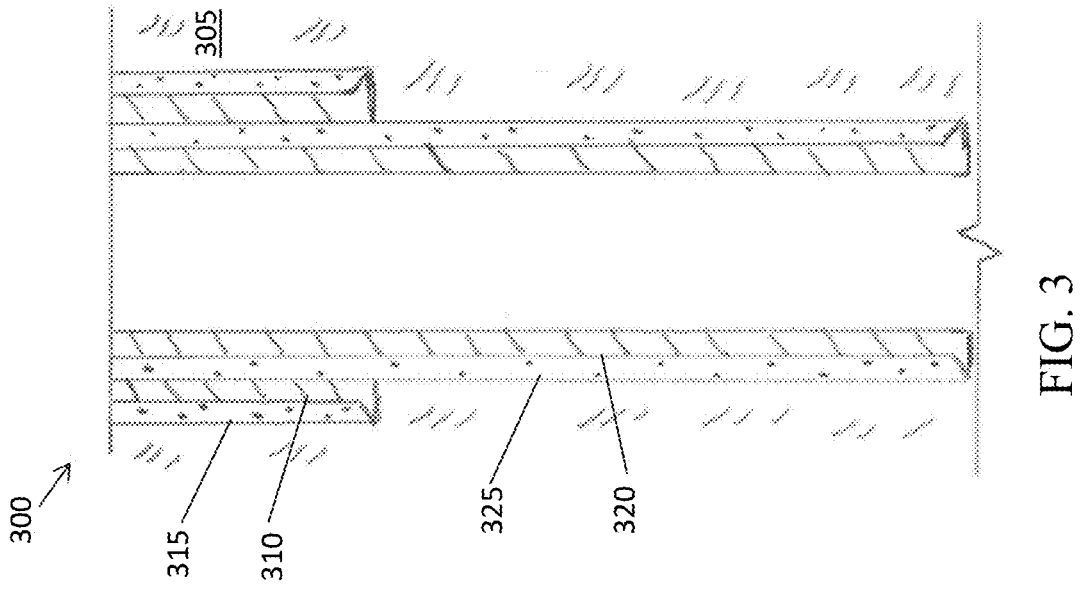
FIG. 3 illustrates a cementing process in a hydrocarbon well in accordance with an example embodiment of the disclosure.

FIG. 1 illustrates a process for manufacturing a cement composition that includes sequestered carbon dioxide. FIG. 2 illustrates a hydrocarbon well undergoing a cementing operation. FIGS. 3 and 4 illustrate in further detail two hydrocarbon wells undergoing cementing operations. FIGS. 5-9 illustrate the size distribution for particles typically used in hydrocarbon well cements.

Referring to FIG. 1, an example method 100 of manufacturing a cement composition in accordance with the example embodiments herein is illustrated. In step 105, a source of carbon dioxide is gathered for use in the method 100. The source of carbon dioxide can be air from the atmosphere or flue gas from the burning of a hydrocarbon. For example, if the method 100 is associated with the manufacture of cement particles, the kiln used to heat limestone is typically heated by burning a hydrocarbon and the flue gas from this burning process can provide the carbon dioxide source for step 105.

In step 110, the carbon dioxide source is contacted with an aqueous solution containing calcium ions. While the carbon dioxide source in step 105 is typically in gas form such as air or flue gas, it should be understood that the state of the carbon dioxide can be modified for the purpose of contacting with the aqueous solution. For example, the carbon dioxide brought into contact with the aqueous solution can be in the state of a gas, a liquid, a solid, or a mixture of one of these states. The carbon dioxide source can be brought into contact with the aqueous solution by bubbling carbon dioxide gas through the aqueous solution or by mixing solid or liquid forms of the carbon dioxide with the fluid flow of the aqueous solution. The carbon dioxide reacts with the aqueous solution and produces carbonic acid, bicarbonate ions, and carbonate ions. The presence of calcium ions in the aqueous solution allows for a greater concentration of the carbon dioxide to be sequestered. It should be understood that in alternate embodiments, other divalent cations such as magnesium ions, can be included in the aqueous solution. After the carbon dioxide is contacted with the aqueous solution, the remaining carbon dioxide source gas, which has now been depleted of the carbon dioxide absorbed in step 110, is discharged in step 115 having less carbon dioxide than when it was the original source gas in step 105. Thus, step 110 removes carbon dioxide from the carbon dioxide source and discharges a depleted carbon dioxide gas in step 115.

In step 120, fine particles are gathered for use in sequestering the carbon dioxide absorbed into the aqueous solution. The fine particles can be the types of additives typically included in cement compositions for a hydrocarbon well, such as hematite, fine sand, coarse sand, glass, silica fume, manganese tetraoxide, or other comparable additives. As another example, the fine particles can be calcium carbonate particles, including mined or synthetically manufactured calcium carbonate particles, which are subsequently coated, in step 125, with a calcium carbonate coating containing sequestered carbon dioxide. In one example embodiment, the fine particles preferably have a substantial content of silicon dioxide, such as greater than 75% by weight of silicon dioxide. A substantial silicon dioxide content enhances the strength of the cement composition produced by method 100. Particles with a silicon dioxide content greater than 75% include fine sand, coarse sand, glass, and silica fume. In order for the cement composition to be compatible with the requirements of a hydrocarbon well, the fine particles have a size with a D50 ranging from 3 microns to 177 microns, and preferably from 3 microns to 35 microns. As used herein, fine particles refers to particles having a size with a D50 range from 3 microns to 177 microns or a D50 range within the range of 3 microns to 35 microns.

Referring to step 125, the fine particles are submerged in the aqueous solution containing carbonates from step 110. While the fine particles are submerged in the aqueous solution, calcium carbonate compositions precipitate and a coating of calcium carbonate forms on the fine particles. The precipitation of the calcium carbonate compositions can be controlled in various ways, including, for example, controlling the temperature of the aqueous solution so that it is in the range of 5 to 70 degrees C. In other examples, other properties of the aqueous solution that can be controlled in order to control precipitation include adjusting the pH of the aqueous solution so that it is in the range of 9 to 14. The result of step 125 is a microaggregate comprising the fine particles having calcium carbonate coatings. The calcium carbonate forms a hard shell on the fine particles and traps the carbon dioxide that was absorbed into the aqueous solution as described in connection with step 110. The calcium carbonate shell formed on the fine particles increases the diameter of the microaggregate particles resulting in microaggregate particles with a D50 ranging from 25 microns to 200 microns, and preferably a D50 ranging from 25 microns to 60 microns.

In step 130, the microaggregate produced in step 125 is blended with cement particles to form a cement composite such as the Class K composite well cement referenced in API Specification 10A. Consistent with specification for Class K, the cement composite can comprise cement particles, calcium sulfate, silica, and the microaggregate produced in step 125. In one example, the cement particles are Portland cement particles as referenced in API Specification 10A. It should be understood that the cement particles are ground cement clinker comprising hydraulic calcium silicates and aluminates that are combined with ground calcium sulfate. The cement composite can also comprise other additives such as retarders and fluid loss agents. Providing the microaggregate as a substitute for a portion of the cement particles achieves the goal of reducing the amount of cement particles needed for the cement application. Additionally, the sequestered carbon dioxide in the calcium carbonate shell of microaggregate particles can offset all or a portion of the carbon dioxide generated in the manufacture of the cement particles. The percentages of cement particles and microaggregate particles in the cement composite can vary. In one example, the cement composite comprises 50% or more by weight of cement particles and 3% to 50% by weight of microaggregate particles.

It should be understood that the example method 100 of FIG. 1 can be modified within the scope of this disclosure. For example, certain steps of method 100 may be altered. Moreover, additional steps may be added in sequence or in parallel to the method 100.

Referring now to FIG. 2, an example of a hydrocarbon well pad 200 is illustrated. In FIG. 2, the well pad 200 includes a first well 205 and a second well 215. The first well 205 has been completed and a rig 210 is disposed over the first well 205. The second well 215 has not yet been completed and a cementing apparatus is attached to a casing of the second well 215. A cementing truck 220 can pump cement through the cementing apparatus and into the second well 215 in order to complete the well for production. While second well 215 is not yet completed in the example illustrated in FIG. 2, in alternate embodiments a cementing truck and cementing apparatus may be attached to a well that is being plugged for abandonment. Two example cementing applications will be described in greater detail in connection with FIGS. 3 and 4.

Referring now to FIG. 3, an example hydrocarbon well 300 is illustrated. The example hydrocarbon well 300 is located in a formation 305. Hydrocarbon well 300 comprises a first casing 310 that extends from the surface into the well a first distance. Hydrocarbon well 300 further comprises a second casing 320 that extends from the surface into the well a second distance that is deeper than the first distance. Each of the first casing 310 and the second 320 has a casing liner. That is, first casing liner 315 is located between the first casing 310 and the formation 305. Second casing liner 325 is located between the first casing 310 and the second casing 320 proximate to the surface and second casing liner 325 is located between the second casing 320 and the formation 305 in the deeper portion of the well. The first casing liner 315 and the second casing liner 325 are formed by pumping a cement composite as described herein into the well. That is, the cement composite used to form first casing liner 315 and second casing liner 325 comprises cement particles combined with microaggregate particles, wherein the microaggregate particles comprise fine particles coated with calcium carbonate as described previously in connection with FIG. 1. The calcium carbonate of the microaggregate particles is formed from carbon dioxide captured from the atmosphere or from a flue gas. Accordingly, the cement composite used in the first casing liner 315 and the second casing liner 325 contains sequestered carbon dioxide and reduces the amount of carbon dioxide that would have been emitted into the atmosphere if conventional cement was used to form the casing liners. Cement placed deep within a hydrocarbon well can be exposed to high temperatures exceeding 230 degrees F. for an extended period of time. Exposure to high temperatures over an extended period of time can weaken the cement. Accordingly, using microaggregate containing substantial amounts of silicon dioxide that can strengthen the cement composite's ability to withstand high temperatures is advantageous. It is preferred that fine particles comprising greater than 75% silicon dioxide, such as fine sand, coarse sand, glass, or silica fume, is used in forming the microaggregate.

Referring now to FIG. 4, an example hydrocarbon well 400 is illustrated. The example hydrocarbon well 400 is located in a formation 405. Hydrocarbon well 400 is similar to hydrocarbon well 300 of FIG. 3 in that it comprises a first casing 410 that extends from the surface into the well a first distance and a second casing 420 that extends from the surface into the well a second distance that is deeper than the first distance. Hydrocarbon well 400 is also similar to hydrocarbon well 300 of FIG. 3 in that each of the first casing 310 and the second 320 are surrounded by a casing liner. As with hydrocarbon well 300, first casing liner 415 and second casing liner 425 are formed by pumping a cement composite as described herein into the hydrocarbon well 400. The cement composite used to form first casing liner 415 and second casing liner 425 comprises cement particles combined with microaggregate particles, wherein the microaggregate particles comprise fine particles coated with calcium carbonate as described previously in connection with FIG. 1. The calcium carbonate of the microaggregate particles is formed from carbon dioxide captured from the atmosphere or from a flue gas. Hydrocarbon well 400 also illustrates tubing 430 which has been used to pump additional cement composite into the well to form a plug 435. Once the cement composite hardens, the plug seals hydrocarbon well 400 so that the well is ready for abandonment after the well is no longer in use. Because the cement composite used in casing liners 415 and 425 and the plug 435 contains sequestered carbon dioxide, the use of the cement composite reduces the amount of carbon dioxide that otherwise would have been emitted into the atmosphere if conventional cement was used in hydrocarbon well 400. Similar to example well 300, it is preferable to use fine particles comprising substantial amounts of silicon dioxide for the cement composite used in the casing liners 415 and 420 and the plug 435 of well 400. Fine particles comprising greater than 75% silicon dioxide, such as fine sand, coarse sand, glass, or silica fume, used to form the microaggregate improve the ability of the cement composite to withstand the high temperatures, often exceeding 230 degrees F., to which the cement composite will be exposed in deep portions of the well over an extended period of time.

Figure 5:
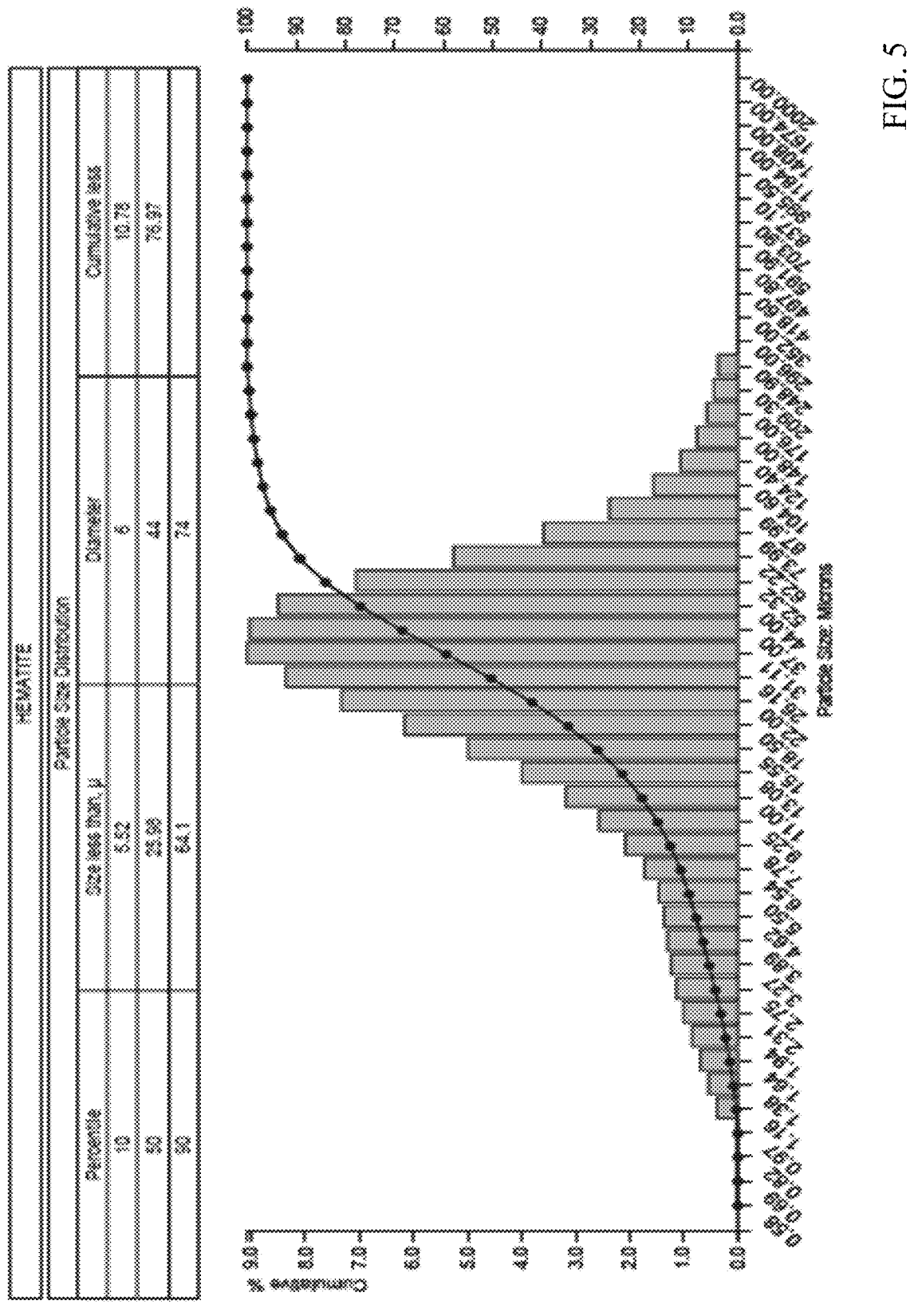
FIG. 5 illustrates a particle size distribution for a hematite additive used in a hydrocarbon well cement in accordance with an example embodiment of the disclosure.
Figure 6:
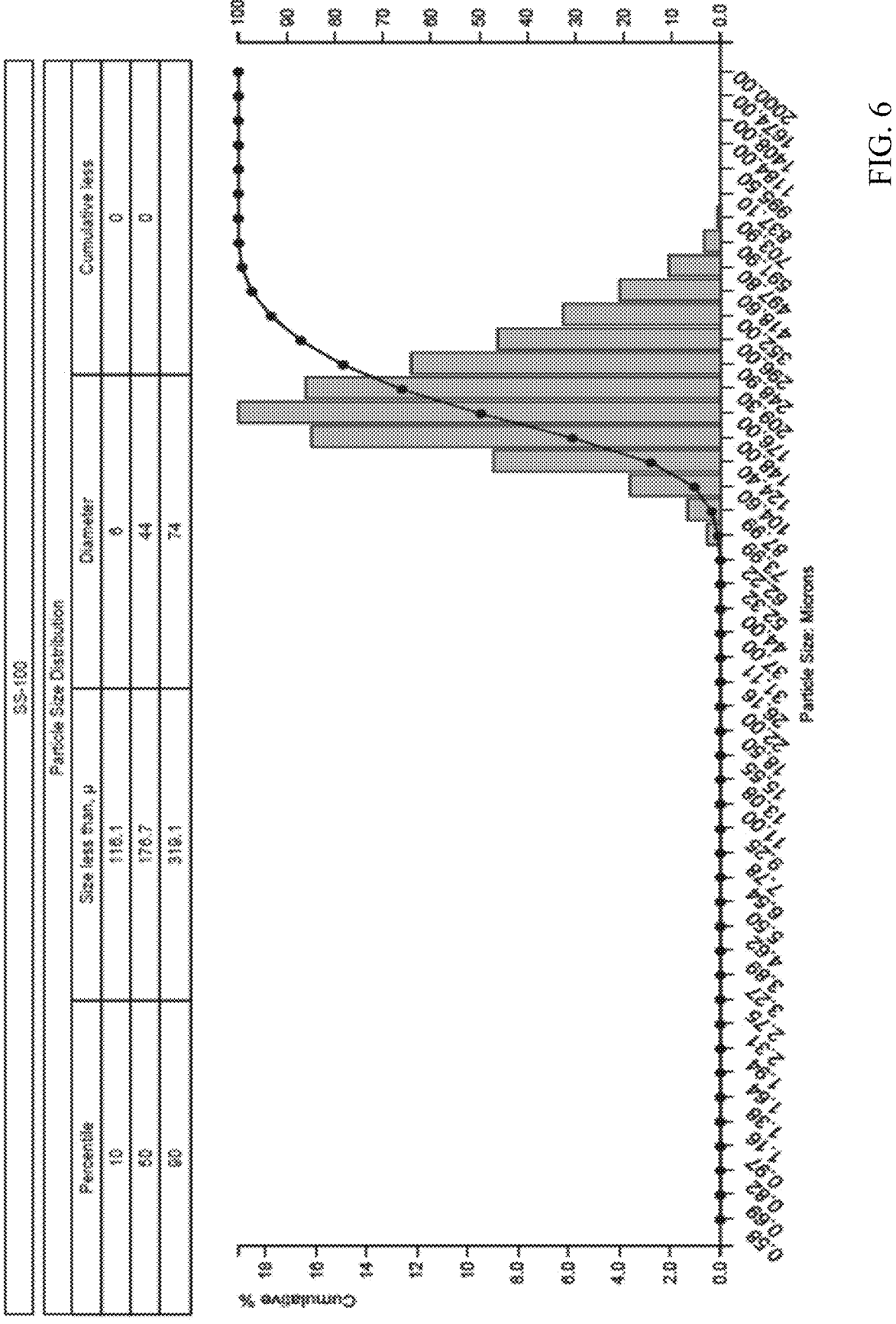
FIG. 6 illustrates a particle size distribution for a coarse sand additive used in a hydrocarbon cement in accordance with an example embodiment of the disclosure.
Figure 7:
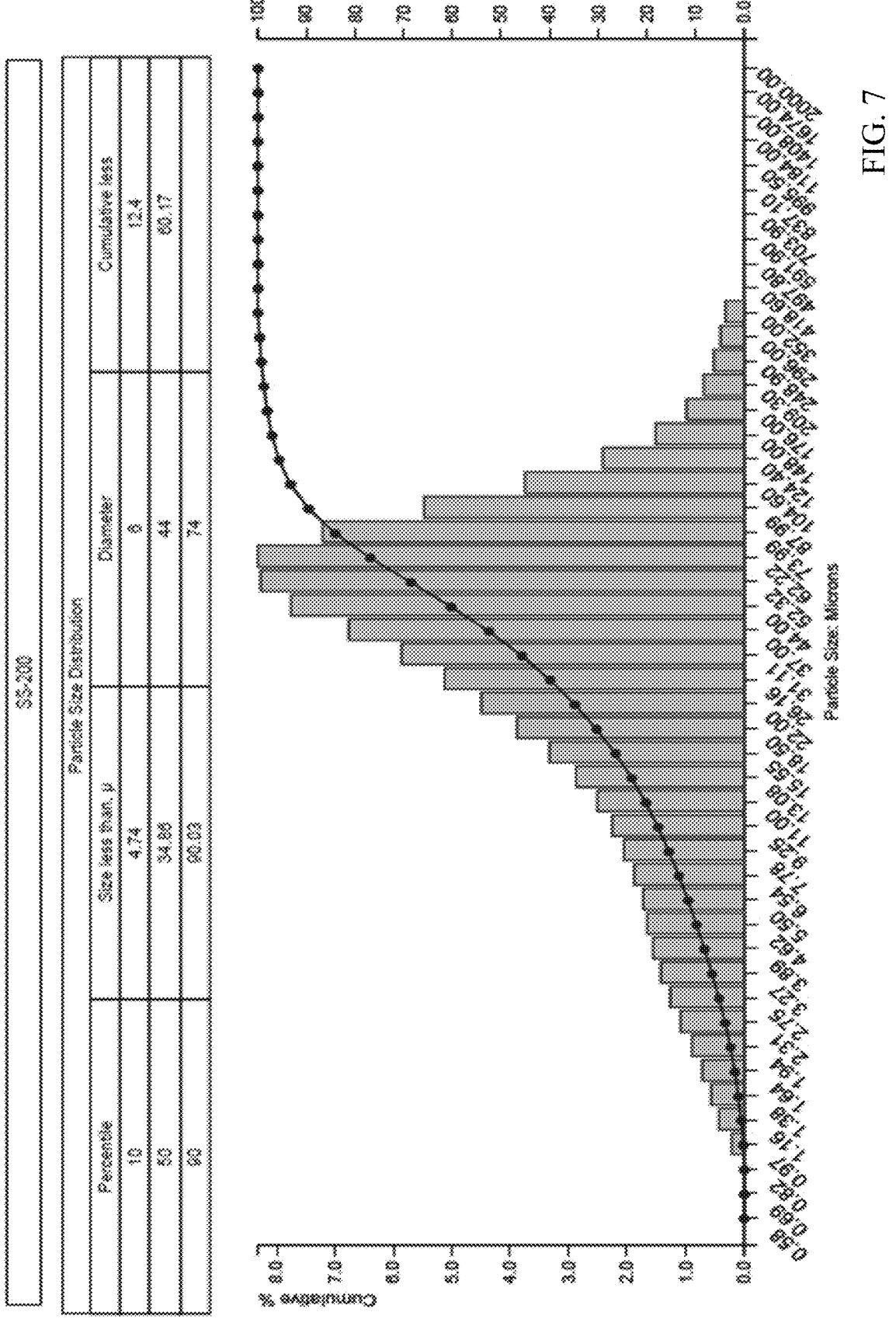
FIG. 7 illustrates a particle size distribution for a fine sand additive used in a hydrocarbon cement in accordance with an example embodiment of the disclosure.
Figure 8:
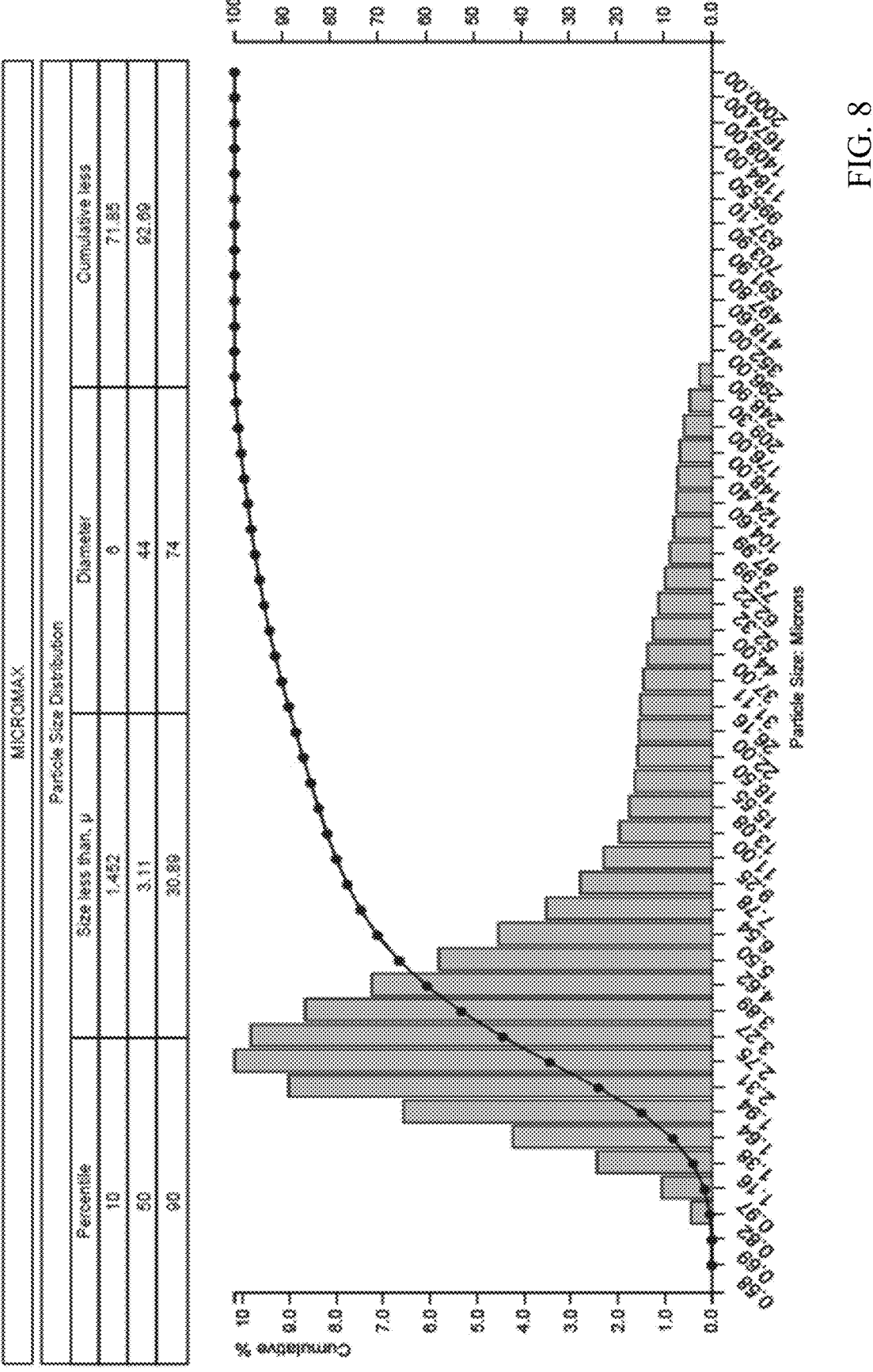
FIG. 8 illustrates a particle size distribution for a manganese tetraoxide additive used in a hydrocarbon cement in accordance with an example embodiment of the disclosure.
Figure 9:
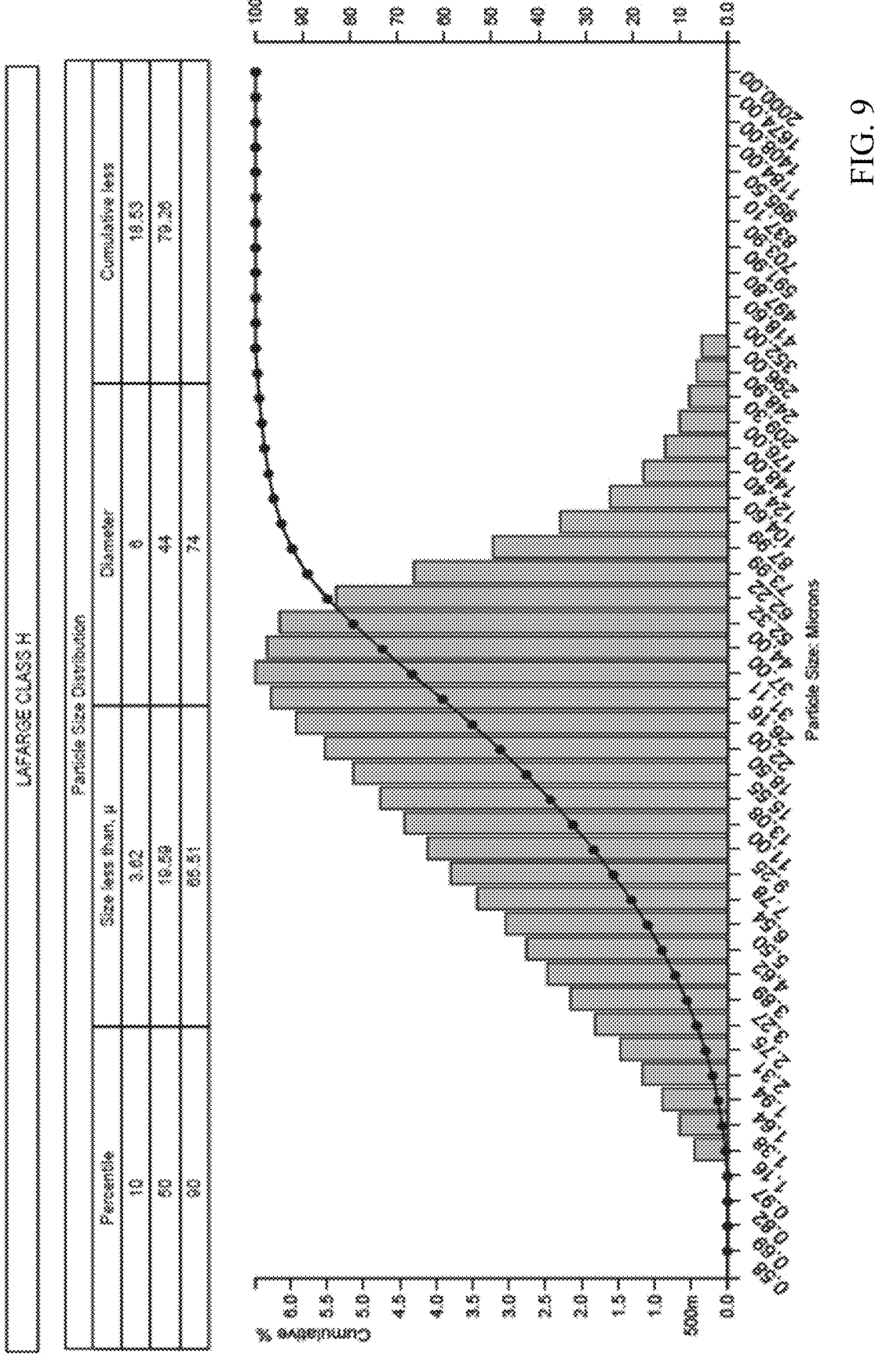
FIG. 9 illustrates a particle size distribution for additives used in a Class H hydrocarbon cement in accordance with an example embodiment of the disclosure.

FIGS. 5-9 illustrate particle size distribution data for the types of particles that are commonly used in hydrocarbon well cements. The types of particles referenced in FIGS. 5-9 can be used as the fine particles of the microaggregate described herein. FIG. 5 illustrates particle size distribution data for hematite having a D50 of 26. FIG. 6 illustrates particle size distribution data for coarse sand having a D50 of 177. FIG. 7 illustrates particle size distribution data for fine sand having a D50 of 35. FIG. 8 illustrates particle size distribution data for manganese tetraoxide having a D50 of 3. FIG. 9 illustrates particle size distribution data for particle additives used in a Class H hydrocarbon cement having a D50 of 20. Because the particles referenced in FIGS. 5-9 have size distributions that meet the requirements for hydrocarbon well cement, they can serve as suitable fine particles for the microaggregate described herein.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one step or component from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method of making a cement composite for a hydrocarbon well, the method comprising:

contacting an aqueous solution comprising calcium ions with a carbon dioxide source producing a carbonated aqueous solution;

submerging fine particles in the carbonated aqueous solution to produce microaggregate particles comprising the fine particles coated with calcium carbonate; and blending the microaggregate particles with cement particles to produce the cement composite, wherein the fine particles comprise a silicon dioxide content of greater than 75%, wherein the fine particles have a D50 value between 3 microns and 35 microns before the fine particles are coated with the calcium carbonate, and wherein the fine particles have a D50 value between 25 microns and 60 microns after being coated with the calcium carbonate.

2. The method of claim 1, wherein the carbon dioxide source is at least one of air and flue gas.

3. The method of claim 1, wherein the fine particles are one of hematite, coarse sand, fine sand, glass, silica fume, manganese tetraoxide, and calcium carbonate.

4. The method of claim 1, wherein the cement composite is a Class K cement composition as defined in API Specification 10A.

5. The method of claim 1, wherein the cement composite comprises greater than or equal to 50% by weight of cement particles and 3% to 50% by weight of microaggregate.

* * * * *